United States Patent
Khafagy et al.

(10) Patent No.: US 10,787,196 B2
(45) Date of Patent: Sep. 29, 2020

(54) METHODS AND APPARATUS FOR CONTROLLING THE RAMP IN OF CURRENT TO AN ELECTRONIC POWER ASSISTED STEERING MOTOR ASSOCIATED WITH AN AUTO STOP-START ENGINE

(71) Applicant: Ford Global Technologies, LLC, Dearborn, MI (US)

(72) Inventors: Hafiz Shafeek Khafagy, Dearborn, MI (US); Hussam Makkiya, Troy, MI (US); Kirt Eschtruth, Livonia, MI (US); Jonathan Edward Gunger, Canton, MI (US); Ahmed Awadi, Farmington Hills, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 307 days.

(21) Appl. No.: 15/640,027

(22) Filed: Jun. 30, 2017

(65) Prior Publication Data
US 2019/0002012 A1  Jan. 3, 2019

(51) Int. Cl.
*B62D 5/04* (2006.01)
*H02P 1/18* (2006.01)
*F02N 11/08* (2006.01)

(52) U.S. Cl.
CPC .......... *B62D 5/046* (2013.01); *F02N 11/0848* (2013.01); *H02P 1/18* (2013.01);
(Continued)

(58) Field of Classification Search
CPC ........ B62D 5/046; B62D 5/0463; B62D 5/04; B62D 5/00; H02P 1/18; H02P 1/029; H02P 1/16; H02P 6/20; H02P 8/04; H02P 21/34; F02N 11/0814; F02N 2250/02; F02N 2200/043; F02N 2200/063; F02N 2200/022; F02N 11/0848–0851; B60W 10/20; B60W 30/18018; B60W 30/1886;
(Continued)

(56) References Cited

U.S. PATENT DOCUMENTS 7,380,619 B2 * 6/2008 Shiokawa ................ B62J 6/003
                                                 180/219
7,528,585 B2 * 5/2009 Maehara ................. H02J 7/244
                                                  322/29

(Continued)

FOREIGN PATENT DOCUMENTS

WO         2016/005808         1/2016

*Primary Examiner* — Jeffrey C Boomer
*Assistant Examiner* — Paul Allen
(74) *Attorney, Agent, or Firm* — Ray Coppielle; Hanley, Flight & Zimmerman, LLC

(57) ABSTRACT

Methods and apparatus for controlling the ramp in of current to an electronic power assisted steering motor associated with an auto stop-start engine are described. A controller is to determine a moving average voltage of a vehicle battery. The controller is also to determine a voltage rate of change based on the moving average voltage. The controller is also to determine a moving average engine speed of an auto stop-start engine of the vehicle. The controller is also to ramp in current to an electronic power assisted steering motor of the vehicle based on the moving average voltage, the voltage rate of change, and the moving average engine speed.

20 Claims, 5 Drawing Sheets

(52) U.S. Cl.
CPC ..... *F02N 11/0814* (2013.01); *F02N 2200/022* (2013.01); *F02N 2250/02* (2013.01)

(58) Field of Classification Search
CPC .. Y02T 10/48; G01R 31/3835; G01R 31/385; G01M 15/046
USPC .................................................. 701/41–44
See application file for complete search history.

(56) References Cited

U.S. PATENT DOCUMENTS

| | | | | |
|---|---|---|---|---|
| 8,204,651 | B2 * | 6/2012 | Tachibana | B62D 5/0457 |
| | | | | 180/402 |
| 8,612,113 | B2 | 12/2013 | Gibson et al. | |
| 8,989,965 | B2 | 3/2015 | Abe et al. | |
| 9,126,620 | B2 | 9/2015 | Sugiyama et al. | |
| 9,150,218 | B2 * | 10/2015 | Makabe | B60W 20/40 |
| 9,499,195 | B2 | 11/2016 | Malone et al. | |
| 9,714,049 | B2 * | 7/2017 | Hosaka | B62D 5/0481 |
| 9,998,101 | B2 * | 6/2018 | Park | H03H 17/026 |
| 10,059,367 | B2 * | 8/2018 | Sone | B62D 5/0481 |
| 2009/0241883 | A1 * | 10/2009 | Nagoshi | F02N 11/0825 |
| | | | | 123/179.4 |
| 2011/0288743 | A1 * | 11/2011 | Smith | F02N 11/0803 |
| | | | | 701/102 |
| 2012/0330508 | A1 * | 12/2012 | Pebley | B62D 5/0481 |
| | | | | 701/41 |
| 2013/0001006 | A1 * | 1/2013 | Gibson | B62D 5/0481 |
| | | | | 180/446 |
| 2015/0047609 | A1 * | 2/2015 | Kleczewski | F02D 41/0097 |
| | | | | 123/438 |
| 2016/0297471 | A1 | 10/2016 | Yamanaka | |
| 2017/0057372 | A1 * | 3/2017 | Loftus | G01R 31/396 |
| 2019/0011492 | A1 * | 1/2019 | Handy | G01R 31/1272 |

* cited by examiner

METHODS AND APPARATUS FOR CONTROLLING THE RAMP IN OF CURRENT TO AN ELECTRONIC POWER ASSISTED STEERING MOTOR ASSOCIATED WITH AN AUTO STOP-START ENGINE

FIELD OF THE DISCLOSURE

This disclosure relates generally to electronic power assisted steering systems and, more particularly, to methods and apparatus for controlling the ramp in of current to an electronic power assisted steering motor associated with an auto stop-start engine.

BACKGROUND

Modern vehicles (e.g., automobiles) are equipped with auto stop-start engines at an increasing rate. Auto stop-start engines are internal combustion engines including and/or controlled by automated stop-start functionality. The automated stop-start functionality is configured to shut down and/or stop the internal combustion engine when the internal combustion engine begins to idle. The automated stop-start functionality is further configured to re-crank and/or auto start the internal combustion engine in response to an indication that the internal combustion engine is no longer intended to be stopped (e.g., as may be indicated by the release of the brake pedal of the vehicle). Stopping the internal combustion engine from operating during the period where the internal combustion engine would otherwise be idling reduces the fuel consumption of the internal combustion engine and/or, more generally, of the vehicle.

Modern vehicles also typically include electronic power assisted steering ("EPAS") systems that provide powered assistance (e.g., power-assisted torque and/or power-assisted momentum) to a steering assembly of the vehicle to increase the ease with which a portion of the steering assembly (e.g., a steering wheel) may be rotated and/or otherwise moved by an occupant (e.g., a driver) of the vehicle. Conventional EPAS systems include an EPAS controller that controls an EPAS motor to provide the above-described powered assistance to the steering assembly. When a conventional EPAS system is implemented in conjunction with an auto stop-start engine, the output of the EPAS motor is typically reduced and/or terminated by the EPAS controller (e.g., by ramping out an input current provided to the EPAS motor) while the auto stop-start engine is auto stopped, thereby resulting in a reduction and/or loss of powered assistance to the steering assembly of the vehicle. Powered assistance to the steering assembly is restored when the output of the EPAS motor is increased and/or resumed by the EPAS controller (e.g., by ramping in the input current provided to the EPAS motor) in connection with the auto stop-start engine being re-cranked and/or auto started subsequent to the auto stop-start engine having been auto stopped.

SUMMARY

Methods and apparatus for controlling the ramp in of current to an electronic power assisted steering motor associated with an auto stop-start engine are disclosed. In some examples, an apparatus is disclosed. In some disclosed examples, the apparatus comprises a controller. In some disclosed examples, the controller is to determine a moving average voltage of a vehicle battery. In some disclosed examples, the controller is to determine a voltage rate of change based on the moving average voltage. In some disclosed examples, the controller is to determine a moving average engine speed of an auto stop-start engine of the vehicle. In some disclosed examples, the controller is to ramp in current to an electronic power assisted steering motor of the vehicle based on the moving average voltage, the voltage rate of change, and the moving average engine speed.

In some examples, a method is disclosed. In some disclosed examples, the method comprises determining, by executing one or more instructions with the controller, a moving average voltage of a vehicle battery. In some disclosed examples, the method comprises determining, by executing one or more instructions with a controller, a voltage rate of change based on the moving average voltage. In some disclosed examples, the method comprises determining, by executing one or more instructions with the controller, a moving average engine speed of auto stop-start engine of the vehicle. In some disclosed examples, the method comprises ramping in, by executing one or more instructions with the controller, current to an electronic power assisted steering motor of the vehicle based on the moving average voltage, the voltage rate of change, and the moving average engine speed.

In some examples, a non-transitory machine readable storage medium comprising instructions is disclosed. In some disclosed examples, the instructions, when executed, cause a controller to determine a moving average voltage of a vehicle battery. In some disclosed examples, the instructions, when executed, cause the controller to determine a voltage rate of change based on the moving average voltage. In some disclosed examples, the instructions, when executed, cause the controller to determine a moving average engine speed of an auto stop-start engine of the vehicle. In some disclosed examples, the instructions, when executed, cause the controller to ramp in current to an electronic power assisted steering motor of the vehicle based on the moving average voltage, the voltage rate of change, and the moving average engine speed.

Figure 1:
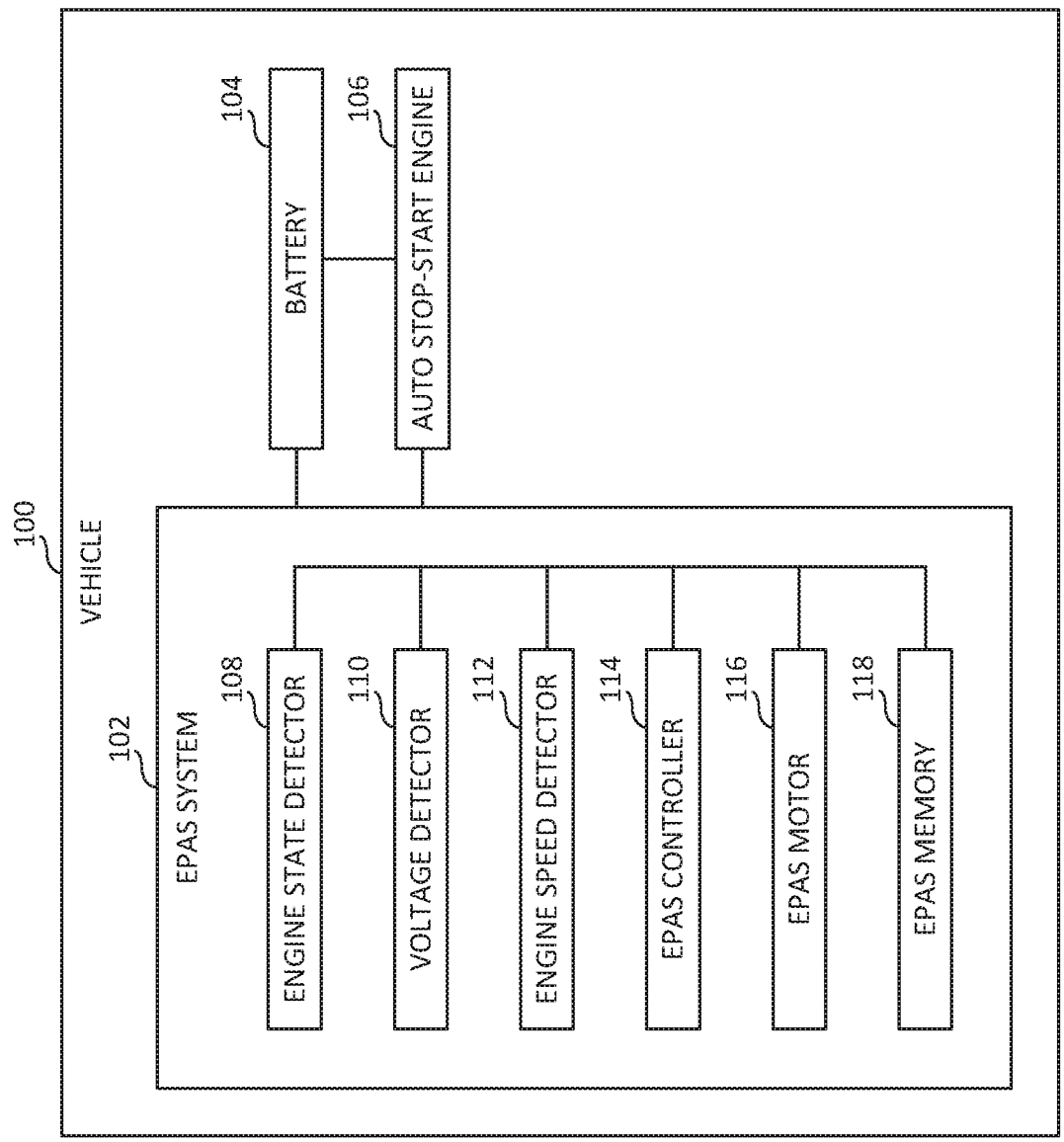
FIG. 1 is a block diagram of an example vehicle including an example EPAS system constructed in accordance with the teachings of this disclosure.

Certain examples are shown in the above-identified figures and described in detail below. In describing these examples, like or identical reference numbers are used to identify the same or similar elements. The figures are not necessarily to scale and certain features and certain views of the figures may be shown exaggerated in scale or in schematic for clarity and/or conciseness.

DETAILED DESCRIPTION

When a conventional EPAS system (e.g., as described above) is implemented in conjunction with an auto stop-start engine (e.g., as described above), the output of the EPAS motor is typically reduced and/or terminated by the EPAS controller (e.g., by ramping out an input current provided to the EPAS motor) while the auto stop-start engine is auto stopped, thereby resulting in a reduction and/or loss of powered assistance to the steering assembly of the vehicle. Powered assistance to the steering assembly is restored when the output of the EPAS motor is increased and/or resumed by the EPAS controller (e.g., by ramping in the input current provided to the EPAS motor) in connection with the auto stop-start engine being re-cranked and/or auto started subsequent to the auto stop-start engine having been auto stopped.

Conventional EPAS systems initiate the ramping in of current to the EPAS motor only after the expiration of a timer. In such conventional EPAS systems, the timer typically begins running and/or counting only after the voltage of a battery of the vehicle implementing the EPAS system exceeds a voltage threshold that is approximately equal to a steady state voltage of the battery (e.g., a voltage of thirteen volts for a twelve volt battery). The implementation of the timer delays the ramping in of current to the EPAS motor, and accordingly delays the provision of powered assistance to the steering assembly of the vehicle. When the battery of the vehicle is aged, the initiation of the aforementioned timer may be delayed by a substantial period of time (e.g. twenty seconds or more) while the voltage of the battery attempts to recover to the steady state voltage in response to the re-cranking and/or auto starting of the auto stop-start engine of the vehicle subsequent to the auto stop-start engine having been auto stopped. Delays in the provision of powered assistance to the steering assembly of the vehicle (e.g., as a result of delays in ramping in current to the EPAS motor) give rise to drivability, performance and/or quality issues. In some instances, such issues result in a reduction in the level of customer (e.g., driver) satisfaction associated with the experience of driving the vehicle.

In comparison to the conventional EPAS systems described above, the methods and apparatus disclosed herein for controlling the ramp in of current to an EPAS motor associated with an auto stop-start engine advantageously reduce the delay in ramping in current to the EPAS motor. For example, rather than ramping in current to the EPAS motor based on the implementation of a timer responsive to a steady state battery voltage (as done in the above-described conventional EPAS systems), the disclosed methods and apparatus advantageously ramp in current to the EPAS motor upon determining that a moving average voltage of the battery of the vehicle exceeds a voltage threshold set below a steady state voltage of the battery, that a voltage rate of change of the battery is greater than or equal to zero, and that a moving average engine speed of the auto stop-start engine of the vehicle exceeds an engine speed threshold set below an idle speed of the auto stop-start engine.

Ramping in current to the EPAS motor based on satisfaction of the aforementioned moving average voltage rate, voltage rate of change, and moving average engine speed conditions advantageously reduces the timer-based delays associated with the conventional EPAS systems described above. Moreover, the determination and subsequent analysis of moving average voltages, voltage rates of change based on the moving average voltages, and moving average engine speeds via the disclosed methods and apparatus ensures that the re-cranking and/or auto starting of the auto stop-start engine of the vehicle is successful prior to the ramping in of current to the EPAS motor. In this regard, the disclosed methods and apparatus offer a performance benefit over conventional EPAS systems that rely upon instant voltages and/or instant engine speeds (the instant values and/or peaks of which may be misleading) for purposes of determining when the ramping in of current to the EPAS motor is to occur. As a result of the aforementioned advantages and/or benefits, the disclosed methods and apparatus for controlling the ramp in of current to an EPAS motor associated with an auto stop-start engine reduce delays in the provision of powered assistance to the steering assembly of the vehicle, reduce drivability, performance and/or quality issues associated with the vehicle, and improve the level of customer (e.g., driver) satisfaction associated with the experience of driving the vehicle.

FIG. 1 is a block diagram of an example vehicle 100 including an example EPAS system 102 constructed in accordance with the teachings of this disclosure. The vehicle 100 of FIG. 1 further includes an example battery 104 and an example auto stop-start engine 106. The EPAS system 102 of FIG. 1 is operatively coupled to (e.g., in electrical communication with) the battery 104 and the auto stop-start engine 106 of FIG. 1. The EPAS system 102 of FIG. 1 includes an example engine state detector 108, an example voltage detector 110, an example engine speed detector 112, an example EPAS controller 114, an example EPAS motor 116, and an example EPAS memory 118. Respective ones of the engine state detector 108, the voltage detector 110, the engine speed detector 112, the EPAS controller 114, the EPAS motor 116, and the EPAS memory 118 of the EPAS system 102 are operatively coupled to one another via a network such as a controller area network ("CAN"). One or more of the engine state detector 108, the voltage detector 110, the engine speed detector 112, the EPAS controller 114, the EPAS motor 116, and/or the EPAS memory 118 of the EPAS system 102 may also be operatively coupled (e.g., via a network such as a CAN) to the battery 104 and/or the auto stop-start engine 106 of the vehicle 100 of FIG. 1.

The battery 104 of FIG. 1 supplies electrical energy to the components of the vehicle 100 of FIG. 1. For example, the battery 104 may supply energy to the engine state detector 108, the voltage detector 110, the engine speed detector 112, the EPAS controller 114, the EPAS motor 116, and/or the EPAS memory 118 of the EPAS system 102 of FIG. 1. The battery 104 may also supply energy to the auto stop-start engine 106 of FIG. 1 to start, crank, and/or re-crank the auto stop-start engine 106 when the auto stop-start engine 106 is stopped and/or auto stopped. The battery 104 of FIG. 1 has an associated voltage. In some examples, the battery 104 of FIG. 1 may be implemented as a twelve volt automotive battery.

The auto stop-start engine 106 of FIG. 1 is an internal combustion engine including and/or controlled by automated stop-start functionality. The automated stop-start functionality is configured to shut down and/or stop the internal combustion engine of the auto stop-start engine 106 when the internal combustion engine begins to idle. The automated stop-start functionality is further configured to re-crank and/or auto start the internal combustion engine of the auto stop-start engine 106 in response to an indication that the internal combustion engine is no longer intended to be stopped (e.g., as may be indicated by the release of the brake pedal of the vehicle 100 of FIG. 1).

The engine state detector 108 of FIG. 1 senses and/or detects one or more operational state(s) (e.g., engine state data) of the auto stop-start engine 106 of FIG. 1. For example, the engine state detector 108 may sense and/or detect that the auto stop-start engine 106 is and/or has been auto stopped. As another example, the engine state detector 108 may additionally or alternatively sense and/or detect that the auto stop-start engine 106 is re-cranking. In some examples, the engine state detector 108 may sense and/or detect that the auto stop-start engine 106 is re-cranking and/or auto starting subsequent to the auto stop-start engine 106 having been auto stopped. Engine state data corresponding to the operational state(s) of the auto stop-start engine 106 of FIG. 1 sensed and/or detected by the engine state detector 108 of FIG. 1 may be stored in the EPAS memory 118 of FIG. 1. In some examples, the engine state data may be accessed by the EPAS controller 114 of FIG. 1 from the EPAS memory 118 of FIG. 1. In other examples, the engine state data may be accessed by the EPAS controller 114 of FIG. 1 directly from the engine state detector 108 of FIG. 1.

In some examples, the engine state detector 108 of FIG. 1 may constantly sense and/or constantly detect the operational state(s) (e.g., the engine state data) of the auto stop-start engine 106 of FIG. 1. In other examples, the engine state detector 108 of FIG. 1 may periodically sense and/or periodically detect the operational state(s) of the auto stop-start engine 106 of FIG. 1 based on a timing interval and/or a sampling frequency implemented via the EPAS controller 114 of FIG. 1. While the engine state detector 108 is shown in the example of FIG. 1 as being integrated into the EPAS system 102 of FIG. 1, the engine state detector 108 may alternatively be located separately from the EPAS system 102 (e.g., at a remote location within the vehicle 100 of FIG. 1). For example, the engine state detector 108 may alternatively be located at and/or integrated into the auto stop-start engine 106 of FIG. 1. In examples where the engine state detector 108 is located remotely from the EPAS system 102, the engine state data sensed and/or detected by the engine state detector 108 may be transmitted to and/or otherwise made accessible to the EPAS controller 114 and/or the EPAS memory 118 of the EPAS system 102 of FIG. 1 via a network such as a CAN.

The voltage detector 110 of FIG. 1 senses, measures and/or detects one or more voltage(s) (e.g., voltage data) of the battery 104 of FIG. 1. In some examples, the voltage detector 110 may sense, measure and/or detect that the voltage(s) of the battery 104 while the auto stop-start engine 106 of FIG. 1 is re-cranking and/or auto starting subsequent to the auto stop-start engine 106 having been auto stopped. Voltage data corresponding to the voltage(s) of the battery 104 of FIG. 1 sensed, measured and/or detected by the voltage detector 110 of FIG. 1 may be stored in the EPAS memory 118 of FIG. 1. In some examples, the voltage data may be accessed by the EPAS controller 114 of FIG. 1 from the EPAS memory 118 of FIG. 1. In other examples, the voltage data may be accessed by the EPAS controller 114 of FIG. 1 directly from the voltage detector 110 of FIG. 1.

In some examples, the voltage detector 110 of FIG. 1 may constantly sense and/or constantly detect the voltage(s) (e.g., the voltage data) of the battery 104 of FIG. 1. In other examples, the voltage detector 110 of FIG. 1 may periodically sense and/or periodically detect the voltage(s) of the battery 104 of FIG. 1 based on a timing interval and/or a sampling frequency implemented via the EPAS controller 114 of FIG. 1. While the voltage detector 110 is shown in the example of FIG. 1 as being integrated into the EPAS system 102 of FIG. 1, the voltage detector 110 may alternatively be located separately from the EPAS system 102 (e.g., at a remote location within the vehicle 100 of FIG. 1). For example, the voltage detector 110 may alternatively be located at and/or integrated into the battery 104 of FIG. 1. In examples where the voltage detector 110 is located remotely from the EPAS system 102, the voltage data sensed and/or detected by the voltage detector 110 may be transmitted to and/or otherwise made accessible to the EPAS controller 114 and/or the EPAS memory 118 of the EPAS system 102 of FIG. 1 via a network such as a CAN.

The engine speed detector 112 of FIG. 1 senses, measures and/or detects one or more engine speed(s) (e.g., engine speed data) of the auto stop-start engine 106 of FIG. 1. In some examples, the engine speed detector 112 may sense, measure and/or detect that the engine speed(s) of the auto stop-start engine 106 while the auto stop-start engine 106 is re-cranking and/or auto starting subsequent to the auto stop-start engine 106 having been auto stopped. Engine speed data corresponding to the engine speed(s) of the auto stop-start engine 106 of FIG. 1 sensed, measured and/or detected by the engine speed detector 112 of FIG. 1 may be stored in the EPAS memory 118 of FIG. 1. In some examples, the engine speed data may be accessed by the EPAS controller 114 of FIG. 1 from the EPAS memory 118 of FIG. 1. In other examples, the engine speed data may be accessed by the EPAS controller 114 of FIG. 1 directly from the engine speed detector 112 of FIG. 1.

In some examples, the engine speed detector 112 of FIG. 1 may constantly sense and/or constantly detect the engine speed(s) (e.g., the engine speed data) of the auto stop-start engine 106 of FIG. 1. In other examples, the engine speed detector 112 of FIG. 1 may periodically sense and/or periodically detect the engine speed(s) of the auto stop-start engine 106 of FIG. 1 based on a timing interval and/or a sampling frequency implemented via the EPAS controller 114 of FIG. 1. While the engine speed detector 112 is shown in the example of FIG. 1 as being integrated into the EPAS system 102 of FIG. 1, the engine speed detector 112 may alternatively be located separately from the EPAS system 102 (e.g., at a remote location within the vehicle 100 of FIG. 1). For example, the engine speed detector 112 may alternatively be located at and/or integrated into the auto stop-start engine 106 of FIG. 1. In examples where the engine speed detector 112 is located remotely from the EPAS system 102, the engine speed data sensed and/or detected by the engine speed detector 112 may be transmitted to and/or otherwise made accessible to the EPAS controller 114 and/or the EPAS memory 118 of the EPAS system 102 of FIG. 1 via a network such as a CAN.

The EPAS controller 114 of FIG. 1 may be implemented by a semiconductor device such as a processor, microprocessor, controller or microcontroller. The EPAS controller 114 and/or, more generally, the EPAS system 102 of FIG. 1 manages and/or controls a ramping in of current to the EPAS motor 116 of FIG. 1 based on data and/or information received, obtained and/or accessed by the EPAS controller 114 and/or the EPAS system 102 from one or more of the engine state detector 108, the voltage detector 110, and/or the engine speed detector 112 of FIG. 1.

The EPAS controller 114 of FIG. 1 determines whether the auto stop-start engine 106 of FIG. 1 is auto stopped based on the engine state data sensed and/or detected by the engine state detector 108 of FIG. 1. If the EPAS controller 114 determines that the auto stop-start engine 106 is auto stopped, the EPAS controller 114 also determines, based on the engine state data sensed and/or detected by the engine state detector 108, whether the auto stop-start engine 106 is re-cranking and/or auto starting subsequent to the auto stop-start engine 106 having been auto stopped. If the EPAS controller 114 determines that the auto stop-start engine 106 is auto stopped and further determines that the auto stop-start engine 106 is re-cranking and/or auto starting subsequent to the auto stop-start engine 106 having been auto stopped, the EPAS controller 114 proceeds with determining and/or generating a voltage buffer and/or an engine speed buffer as further described below. If the EPAS controller 114 instead determines that the auto stop-start engine 106 is not auto stopped, and/or that the auto stop-start engine 106 is not re-cranking and/or auto starting subsequent to the auto stop-start engine 106 having been auto stopped, the EPAS controller 114 foregoes determining and/or generating a voltage buffer and/or an engine speed buffer.

The EPAS controller 114 of FIG. 1 determines and/or generates a voltage buffer (e.g., voltage buffer data) based on the voltages (e.g., the voltage data) of the battery 104 of FIG. 1 sensed, measured and/or detected by the voltage detector 110 of FIG. 1. In some examples, the EPAS controller 114 determines and/or generates the voltage buffer while the auto stop-start engine 106 of FIG. 1 is re-cranking and/or auto starting subsequent to the auto stop-start engine 106 having been auto stopped. In some examples, the EPAS controller 114 determines and/or generates the voltage buffer based on a timing interval and/or a sampling frequency implemented via the EPAS controller 114. For example, the EPAS controller 114 may determine and/or generate a voltage buffer ("VB") having the following arrangement and/or organizational scheme:

$$VB(t)=[V(t),V(t-TS),V(t-2TS), \ldots V(t-(N-1)(TS))]$$

where "t" is a given time, "VB(t)" is the voltage buffer at the given time (e.g., a time-based voltage buffer), "V(t)" is a voltage of the battery 104 of FIG. 1 at the given time (e.g., a time-based voltage), "TS" is a time step and/or time interval at which the voltage of the battery 104 is to be detected, and "N" is a total number of time-based voltage samples to be included and/or stored in the voltage buffer.

Data corresponding to the respective values for the time step and/or time interval "TS" and the number of time-based voltage samples "N" to be implemented by the EPAS controller 114 when determining and/or generating the voltage buffer may be stored in the EPAS memory 118 of FIG. 1. In some examples, the time step and/or time interval "TS" of the voltage buffer and the number of time-based voltage samples "N" of the voltage buffer are respectively configurable and/or programmable to different values. For example, the EPAS controller 114 and/or the EPAS memory 118 of FIG. 1 may receive (e.g., via a network such as a CAN) data and/or information indicating respective values for the time step and/or time interval "TS" and the number of time-based voltage samples "N" to be implemented by the EPAS controller 114 when determining and/or generating the voltage buffer. Voltage buffer data corresponding to the voltage buffer determined and/or generated by the EPAS controller 114 of FIG. 1 may be stored in the EPAS memory 118 of FIG. 1. The stored voltage buffer data may subsequently be accessed by the EPAS controller 114 of FIG. 1 from the EPAS memory 118 of FIG. 1.

The EPAS controller 114 of FIG. 1 determines and/or generates an engine speed buffer (e.g., engine speed buffer data) based on the engine speeds (e.g., the engine speed data) of the auto stop-start engine 106 of FIG. 1 sensed, measured and/or detected by the engine speed detector 112 of FIG. 1. In some examples, the EPAS controller 114 determines and/or generates the engine speed buffer while the auto stop-start engine 106 of FIG. 1 is re-cranking and/or auto starting subsequent to the auto stop-start engine 106 having been auto stopped. In some examples, the EPAS controller 114 determines and/or generates the engine speed buffer based on a timing interval and/or a sampling frequency implemented via the EPAS controller 114. For example, the EPAS controller 114 may determine and/or generate an engine speed buffer ("ESB") having the following arrangement and/or organizational scheme:

$$ESB(t)=[ES(t),ES(t-TS),ES(t-2TS), \ldots ES(t-(N-1)(TS))]$$

where "t" is a given time, "ESB(t)" is the engine speed buffer at the given time (e.g., a time-based engine speed buffer), "ES(t)" is an engine speed of the auto stop-start engine 106 of FIG. 1 at the given time (e.g., a time-based engine speed), "TS" is a time step and/or time interval at which the engine speed of the auto stop-start engine 106 is to be detected, and "N" is a total number of time-based engine speed samples to be included and/or stored in the engine speed buffer.

Data corresponding to the respective values for the time step and/or time interval "TS" and the number of time-based engine speed samples "N" to be implemented by the EPAS controller 114 when determining and/or generating the engine speed buffer may be stored in the EPAS memory 118 of FIG. 1. In some examples, the time step and/or time interval "TS" of the engine speed buffer and the number of time-based engine speed samples "N" of the engine speed buffer are respectively configurable and/or programmable to different values. For example, the EPAS controller 114 and/or the EPAS memory 118 of FIG. 1 may receive (e.g., via a network such as a CAN) data and/or information indicating respective values for the time step and/or time interval "TS" and the number of time-based engine speed samples "N" to be implemented by the EPAS controller 114 when determining and/or generating the engine speed buffer. In some examples, the respective values for the time step and/or time interval "TS" and the number of time-based engine speed samples "N" to be implemented by the EPAS controller 114 when determining and/or generating the engine speed buffer match corresponding ones of the respective values for the time step and/or time interval "TS" and the number of time-based engine speed samples "N" to be implemented by the EPAS controller 114 when determining and/or generating the voltage buffer, as described above. Engine speed buffer data corresponding to the engine speed buffer determined and/or generated by the EPAS controller 114 of FIG. 1 may be stored in the EPAS memory 118 of FIG. 1. The stored engine speed buffer data may subsequently be accessed by the EPAS controller 114 of FIG. 1 from the EPAS memory 118 of FIG. 1.

The EPAS controller 114 of FIG. 1 determines and/or calculates a moving average voltage (e.g., moving average voltage data) based on the voltage buffer (e.g., the voltage buffer data). In some examples, the EPAS controller 114 determines and/or calculates the moving average voltage while the auto stop-start engine 106 of FIG. 1 is re-cranking and/or auto starting subsequent to the auto stop-start engine 106 having been auto stopped. In some examples, the EPAS controller 114 determines and/or calculates the moving average voltage based in part on the timing interval and the sampling frequency implemented via the EPAS controller 114 when determining and/or generating the voltage buffer. For example, the EPAS controller 114 may determine and/or calculate a moving average voltage ("MAV") based on the above-described voltage buffer according to the following equation:

$$MAV(t)=[V(t)+V(t-TS)+V(t-2TS)+V(t-(N-1)(TS))]/(N)$$

where "t" is the given time, "MAV(t)" is the moving average voltage at the given time (e.g., a time-based moving average voltage), "V(t)" is the voltage of the battery 104 of FIG. 1 at the given time (e.g., the time-based voltage), "TS" is the time step and/or time interval at which the voltage of the battery 104 was detected, and "N" is the total number of time-based voltage samples included and/or stored in the voltage buffer. Moving average voltage data corresponding to the moving average voltage determined and/or calculated by the EPAS controller 114 of FIG. 1 may be stored in the EPAS memory 118 of FIG. 1. The stored moving average voltage data may subsequently be accessed by the EPAS controller 114 of FIG. 1 from the EPAS memory 118 of FIG. 1.

The EPAS controller 114 of FIG. 1 determines and/or calculates a voltage rate of change (e.g., voltage rate of change data) based on the voltage buffer (e.g., the voltage buffer data) and/or based on the moving average voltage (e.g., the moving average voltage data). In some examples, the EPAS controller 114 determines and/or calculates the voltage rate of change while the auto stop-start engine 106 of FIG. 1 is re-cranking and/or auto starting subsequent to the auto stop-start engine 106 having been auto stopped. In some examples, the EPAS controller 114 determines and/or calculates the moving average voltage based in part on the timing interval and the sampling frequency implemented via the EPAS controller 114 when determining and/or generating the voltage buffer. In some examples, the EPAS controller 114 determines and/or calculates the voltage rate of change based on successive moving average voltages determined and/or calculated by the EPAS controller 114. For example, the EPAS controller 114 may determine and/or calculate a voltage rate of change ("VRC") based on the above-described voltage buffer and/or the above-described moving average voltage according to the following equations:

$$MAV(t)=[V(t)+V(t-TS)+V(t-2TS)+ \ldots V(t-(N-1)(TS))]/(N)$$

$$MAV(t-TS)=[V(t-TS)+V(t-2TS)+V(t-3TS)+ \ldots V(t-(N)(TS))]/(N)$$

$$VRC(t)=[(MAV(t))-(MAV(t-TS))]/(TS)$$

where "t" is the given time, "MAV(t)" is the moving average voltage at the given time, "MAV(t-TS) is the moving average voltage at the time interval prior to the given time, "VRC(t)" is the voltage rate of change at the given time, "V(t)" is the voltage of the battery 104 of FIG. 1 at the given time (e.g., the time-based voltage), "TS" is the time step and/or time interval at which the voltage of the battery 104 was detected, and "N" is the total number of time-based voltage samples included and/or stored in the voltage buffer. Voltage rate of change data corresponding to the voltage rate of change determined and/or calculated by the EPAS controller 114 of FIG. 1 may be stored in the EPAS memory 118 of FIG. 1. The stored voltage rate of change data may subsequently be accessed by the EPAS controller 114 of FIG. 1 from the EPAS memory 118 of FIG. 1.

The EPAS controller 114 of FIG. 1 determines and/or calculates a moving average engine speed (e.g., moving average engine speed data) based on the engine speed buffer (e.g., the engine speed buffer data). In some examples, the EPAS controller 114 determines and/or calculates the moving average engine speed while the auto stop-start engine 106 of FIG. 1 is re-cranking and/or auto starting subsequent to the auto stop-start engine 106 having been auto stopped. In some examples, the EPAS controller 114 determines and/or calculates the moving average engine speed based in part on the timing interval and the sampling frequency implemented via the EPAS controller 114 when determining and/or generating the engine speed buffer. For example, the EPAS controller 114 may determine and/or calculate a moving average engine speed ("MAES") based on the above-described engine speed buffer according to the following equation:

$$MAES(t)=[ES(t)+ES(t-TS)+ES(t-2TS)+ \ldots ES(t-(N-1)(TS))]/(N)$$

where "t" is the given time, "MAES(t)" is the moving average engine speed at the given time (e.g., a time-based moving average engine speed), "ES(t)" is the engine speed of the auto stop-start engine 106 of FIG. 1 at the given time (e.g., the time-based engine speed), "TS" is the time step and/or time interval at which the engine speed of the auto stop-start engine 106 was detected, and "N" is the total number of time-based engine speed samples included and/or stored in the engine speed buffer. Moving average engine speed data corresponding to the moving average engine speed determined and/or calculated by the EPAS controller 114 of FIG. 1 may be stored in the EPAS memory 118 of FIG. 1. The stored moving average engine speed data may subsequently be accessed by the EPAS controller 114 of FIG. 1 from the EPAS memory 118 of FIG. 1.

The EPAS controller 114 of FIG. 1 determines whether the moving average voltage (e.g., the moving average voltage data) exceeds a voltage threshold (e.g., voltage threshold data). For example, the EPAS controller 114 may determine that an example moving average voltage equal to eleven volts exceeds an example voltage threshold equal to ten volts. In some examples, the EPAS controller 114 determines whether the moving average voltage exceeds the voltage threshold while the auto stop-start engine 106 of FIG. 1 is re-cranking and/or auto starting subsequent to the auto stop-start engine 106 having been auto stopped.

Voltage threshold data corresponding to the voltage threshold to which the EPAS controller 114 compares the moving average voltage may be stored in the EPAS memory 118 of FIG. 1. The stored voltage threshold data may subsequently be accessed by the EPAS controller 114 of FIG. 1 from the EPAS memory 118 of FIG. 1. In some examples, the voltage threshold is configurable and/or programmable to different values. For example, the EPAS controller 114 and/or the EPAS memory 118 of FIG. 1 may receive (e.g., via a network such as a CAN) data and/or information indicating a value for the voltage threshold to be implemented by the EPAS controller 114 when determining whether the moving average voltage exceeds the voltage threshold. In some examples, the voltage threshold is programmed and/or configured to have a value of between nine volts and eleven volts.

The EPAS controller 114 of FIG. 1 determines whether the voltage rate of change (e.g., the voltage rate of change data) is greater than or equal to zero. For example, the EPAS controller 114 may determine that an example voltage rate of change equal to one volt is greater than zero volts. In some examples, the EPAS controller 114 determines whether the voltage rate of change is greater than or equal to zero volts while the auto stop-start engine 106 of FIG. 1 is re-cranking and/or auto starting subsequent to the auto stop-start engine 106 having been auto stopped.

The EPAS controller 114 of FIG. 1 determines whether the moving average engine speed (e.g., the moving average engine speed data) exceeds an engine speed threshold (e.g., engine speed threshold data). For example, the EPAS controller 114 may determine that an example moving average engine speed equal to a value corresponding to ninety percent of the idle speed of the auto stop-start engine 106 of FIG. 1 exceeds an example engine speed threshold equal to a value corresponding to eighty percent of the idle speed of the auto stop-start engine 106. In some examples, the EPAS controller 114 determines whether the moving average engine speed exceeds the engine speed threshold while the auto stop-start engine 106 of FIG. 1 is re-cranking and/or auto starting subsequent to the auto stop-start engine 106 having been auto stopped.

Engine speed threshold data corresponding to the engine speed threshold to which the EPAS controller 114 compares the moving average engine speed may be stored in the EPAS memory 118 of FIG. 1. The stored engine speed threshold data may subsequently be accessed by the EPAS controller 114 of FIG. 1 from the EPAS memory 118 of FIG. 1. In some examples, the engine speed threshold is configurable and/or programmable to different values. For example, the EPAS controller 114 and/or the EPAS memory 118 of FIG. 1 may receive (e.g., via a network such as a CAN) data and/or information indicating a value for the engine speed threshold to be implemented by the EPAS controller 114 when determining whether the moving average engine speed exceeds the engine speed threshold. In some examples, the engine speed threshold is programmed and/or configured to have a value corresponding to between sixty percent and ninety percent of the idle speed of the auto stop-start engine 106 of FIG. 1.

In response to determining that the moving average voltage exceeds the voltage threshold, that the voltage rate of change is greater than or equal to zero, and that the moving average engine speed exceeds the engine speed threshold, the EPAS controller 114 of FIG. 1 generates one or more control signal(s) to ramp in current to the EPAS motor 116 of FIG. 1 according to a ramp in rate (e.g., ramp in rate data). In some examples, the EPAS controller 114 generates the control signal(s) to ramp in the current to the EPAS motor 116 while the auto stop-start engine 106 of FIG. 1 is re-cranking and/or auto starting subsequent to the auto stop-start engine 106 having been auto stopped.

Ramp in rate data corresponding to the rate at which the current is to be ramped in to the EPAS motor 116 of FIG. 1 may be stored in the EPAS memory 118 of FIG. 1. The stored ramp in rate data may subsequently be accessed by the EPAS controller 114 of FIG. 1 from the EPAS memory 118 of FIG. 1. In some examples, the ramp in rate is configurable and/or programmable to different values. For example, the EPAS controller 114 and/or the EPAS memory 118 of FIG. 1 may receive (e.g., via a network such as a CAN) data and/or information indicating a value for the ramp in rate to be implemented by the EPAS controller 114 and/or the EPAS motor 116 of FIG. 1 when ramping in the current to the EPAS motor 116.

The EPAS motor 116 of FIG. 1 provides powered assistance (e.g., power-assisted torque and/or power-assisted momentum) to a steering assembly of the vehicle 100 of FIG. 1 to increase the ease with which a portion of the steering assembly (e.g., a steering wheel) may be rotated and/or otherwise moved by an occupant (e.g., a driver) of the vehicle 100 of FIG. 1. The degree and/or extent to which the EPAS motor 116 of FIG. 1 provides such powered assistance to the steering assembly increases as the current to the EPAS motor 116 is ramped in based on the above-described control signal(s) generated by the EPAS controller 114 of FIG. 1.

The EPAS memory 118 of FIG. 1 may be implemented by any type(s) and/or any number(s) of storage device(s) such as a storage drive, a flash memory, a read-only memory (ROM), a random-access memory (RAM), a cache and/or any other storage medium in which information is stored for any duration (e.g., for extended time periods, permanently, brief instances, for temporarily buffering, and/or for caching of the information). The information stored in the EPAS memory 118 may be stored in any file and/or data structure format, organization scheme, and/or arrangement.

Data and/or information received by the EPAS controller 114 of FIG. 1, and/or, more generally, by the EPAS system 102 of FIG. 1 from any the engine state detector 108, the voltage detector 110, the engine speed detector 112, and/or the EPAS motor 116 of FIG. 1 may be stored in the EPAS memory 118 of FIG. 1. Data and/or information corresponding to any of the above-described engine state date, voltage data, engine speed data, time interval and/or time step data for a voltage buffer, sampling number data for a voltage buffer, voltage buffer data, time interval and/or time step data for an engine speed buffer, sampling number data for an engine speed buffer, engine speed buffer data, time interval and/or time step data for a moving average voltage, sampling number data for a moving average voltage, moving average voltage data, voltage rate of change data, time interval and/or time step data for a moving average engine speed, sampling number data for a moving average engine speed, moving average engine speed data, voltage threshold data, engine speed threshold data, and/or ramp in rate data may also be stored in the EPAS memory 118. Data and/or information stored in the EPAS memory 118 is accessible to the EPAS controller 114 of FIG. 1 and/or, more generally, to the EPAS system 102 of FIG. 1.

While an example manner of implementing the EPAS system 102 is illustrated in FIG. 1, one or more of the elements, processes and/or devices illustrated in FIG. 1 may be combined, divided, re-arranged, omitted, eliminated and/or implemented in any other way. Further, the example engine state detector 108, the example voltage detector 110, the example engine speed detector 112, the example EPAS controller 114, the example EPAS motor 116, the example EPAS memory 118 and/or, more generally, the example EPAS system 102 of FIG. 1 may be implemented by hardware, software, firmware and/or any combination of hardware, software and/or firmware. Thus, for example, any of the example engine state detector 108, the example voltage detector 110, the example engine speed detector 112, the example EPAS controller 114, the example EPAS motor 116, the example EPAS memory 118 and/or, more generally, the example EPAS system 102 of FIG. 1 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example engine state detector 108, the example voltage detector 110, the example engine speed detector 112, the example EPAS controller 114, the example EPAS motor 116, the example EPAS memory 118 and/or, more generally, the example EPAS system 102 of FIG. 1 is/are hereby expressly defined to include a non-transitory computer readable storage device or storage disk such as a memory, a digital versatile disk (DVD), a compact disk (CD), a Blu-ray disk, etc. including the software and/or firmware. Further still, the example EPAS system 102 of FIG. 1 may include one or more elements, processes and/or devices in addition to, or instead of, those illustrated in FIG. 1, and/or may include more than one of any or all of the illustrated elements, processes and devices.

Figure 2:
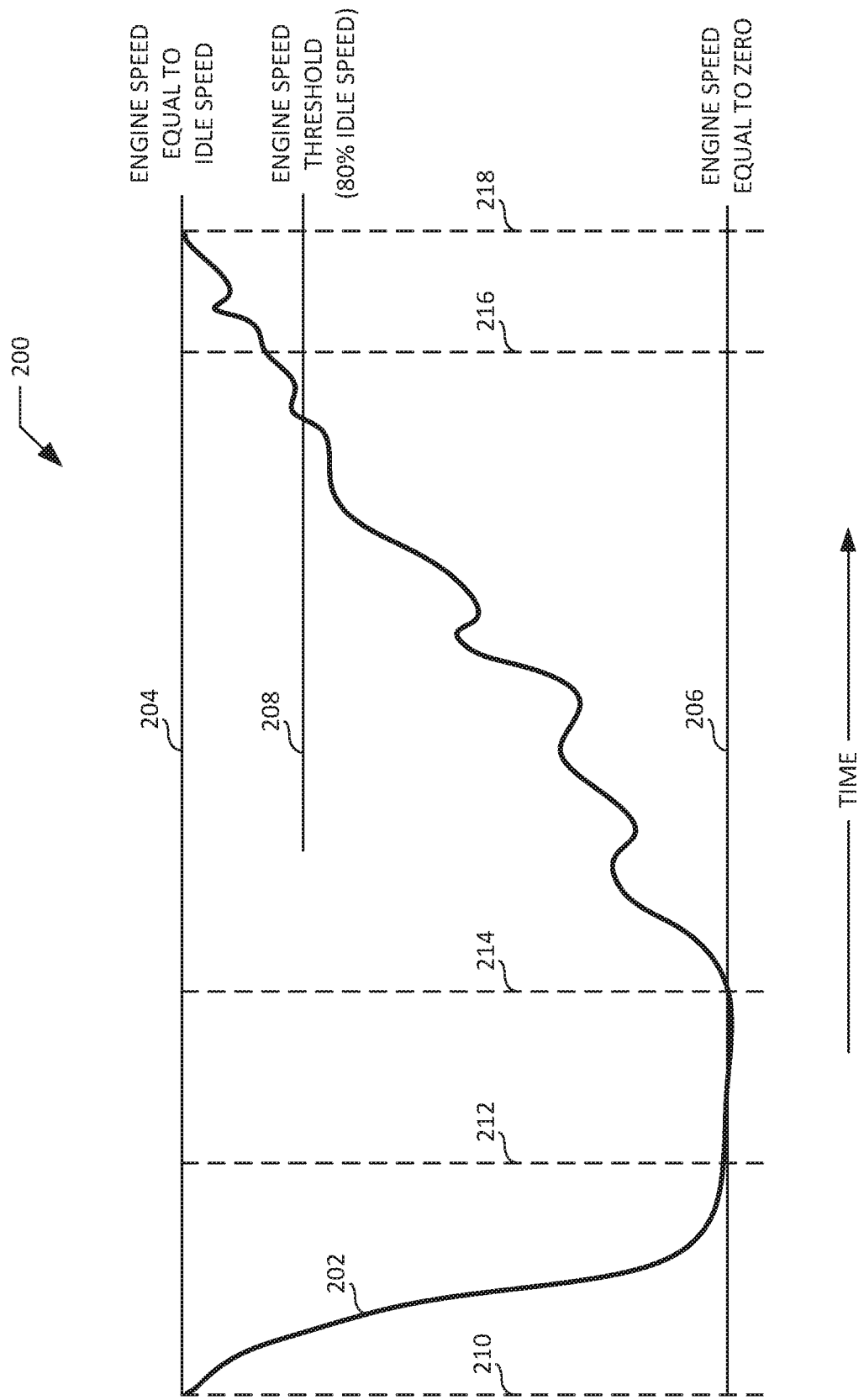
FIG. 2 is an example graph illustrating an example plot of engine speed as a function of time, as may be encountered by the example EPAS system of FIG. 1

FIG. 2 is an example graph 200 illustrating an example plot 202 of engine speed as a function of time, as may be encountered by the example EPAS system 102 of FIG. 1. As shown in the illustrated example of FIG. 2, the vertical axis (e.g., the engine speed axis) of the graph 200 is marked with a first example engine speed 204, a second example engine speed 206, and a third example engine speed 208. As further shown in the illustrated example of FIG. 2, the horizontal axis (e.g., the time axis) of the graph 200 is marked with a first example time 210, a second example time 212 subsequent to the first time 210, a third example time 214 subsequent to the second time 212, a fourth example time 216 subsequent to the third time 214, and a fifth example time 218 subsequent to the fourth time 216.

The first engine speed 204 of FIG. 2 corresponds to an example idle speed of the auto stop-start engine 106 of FIG. 1 that occurs while the auto stop-start engine 106 is idling or otherwise running and/or operating. The second engine speed 206 of FIG. 2 corresponds to an example engine speed of zero that occurs while the auto stop-start engine 106 of FIG. 1 is auto stopped and before the auto stop-start engine 106 is re-cranked subsequent to the auto stop-start engine 106 having been auto stopped. The third engine speed 208 of FIG. 2 (e.g., eighty percent of the idle speed of the auto stop-start engine 106 of FIG. 1) corresponds to an example engine speed threshold to be implemented by the EPAS controller 114 of FIG. 1 when determining whether a moving average engine speed of the auto stop-start engine 106 of FIG. 1 exceeds the engine speed threshold.

The period of time between the first time 210 and the second time 212 of FIG. 2 corresponds to an example period of time during which the auto stop-start engine 106 of FIG. 1 is auto stopping. As shown by the plot 202 of FIG. 2, the engine speed of the auto stop-start engine 106 of FIG. 1 drops (e.g., decreases) from the first engine speed 204 of FIG. 2 (e.g., engine speed equal to idle speed) to the second engine speed 206 of FIG. 2 (e.g., engine speed equal to zero) between the first time 210 and the second time 212 of FIG. 2. The period of time between the second time 212 and the third time 214 of FIG. 2 corresponds to an example period of time during which the auto stop-start engine 106 of FIG. 1 is auto stopped. As shown by the plot 202 of FIG. 2, the engine speed of the auto stop-start engine 106 of FIG. 1 is remains at the second engine speed 206 of FIG. 2 (e.g., engine speed equal to zero) between the second time 212 and the third time 214 of FIG. 2.

The third time 214 of FIG. 2 corresponds to an example time at which the auto stop-start engine 106 of FIG. 1 is re-cranked. The period of time between the third time 214 and the fourth time 216 of FIG. 2 corresponds to an example period of time during which the auto stop-start engine 106 of FIG. 1 is auto starting in response to being re-cranked. As shown by the plot 202 of FIG. 2, the engine speed of the auto stop-start engine 106 of FIG. 1 rises (e.g., increases) from the second engine speed 206 of FIG. 2 (e.g., engine speed equal to zero) to the third engine speed 208 of FIG. 2 (e.g., engine speed equal to eighty percent idle speed) between the third time 214 and the fourth time 216 of FIG. 2.

The fourth time 216 of FIG. 2 corresponds to an example time at which the EPAS controller 114 of FIG. 1 generates one or more control signal(s) to ramp in current to the EPAS motor 116 of FIG. 1. For example, in response to determining at the fourth time 216 of FIG. 2 that a moving average engine speed of the auto stop-start engine 106 of FIG. 1 exceeds an engine speed threshold (e.g., the engine speed threshold corresponding to eighty percent of idle speed as indicated by the third engine speed 208 of FIG. 2), and further determining (as described in connection with FIG. 3 below) that a moving average voltage of the battery 104 of FIG. 1 exceeds a voltage threshold (e.g., the voltage threshold of 10.0 V as indicated by the fourth voltage 310 of FIG. 3) and that a voltage rate of change of the battery 104 is greater than or equal to zero, the EPAS controller 114 may generate one or more control signal(s) at the fifth time 320 of FIG. 3 to ramp in current to the EPAS motor 116.

The period of time between the fourth time 216 and the fifth time 218 of FIG. 2 corresponds to an example period of time during which the engine speed of the auto stop-start engine 106 of FIG. 1 continues to rise in response to the auto stop-start engine 106 being auto started. As shown by the plot 202 of FIG. 2, the engine speed of the auto stop-start engine 106 of FIG. 1 rises (e.g., increases) from the third engine speed 208 of FIG. 2 (e.g., engine speed equal to eighty percent idle speed) to the first engine speed 204 of FIG. 2 (e.g., engine speed equal to idle speed) between the fourth time 216 and the fifth time 218 of FIG. 2.

Figure 3:
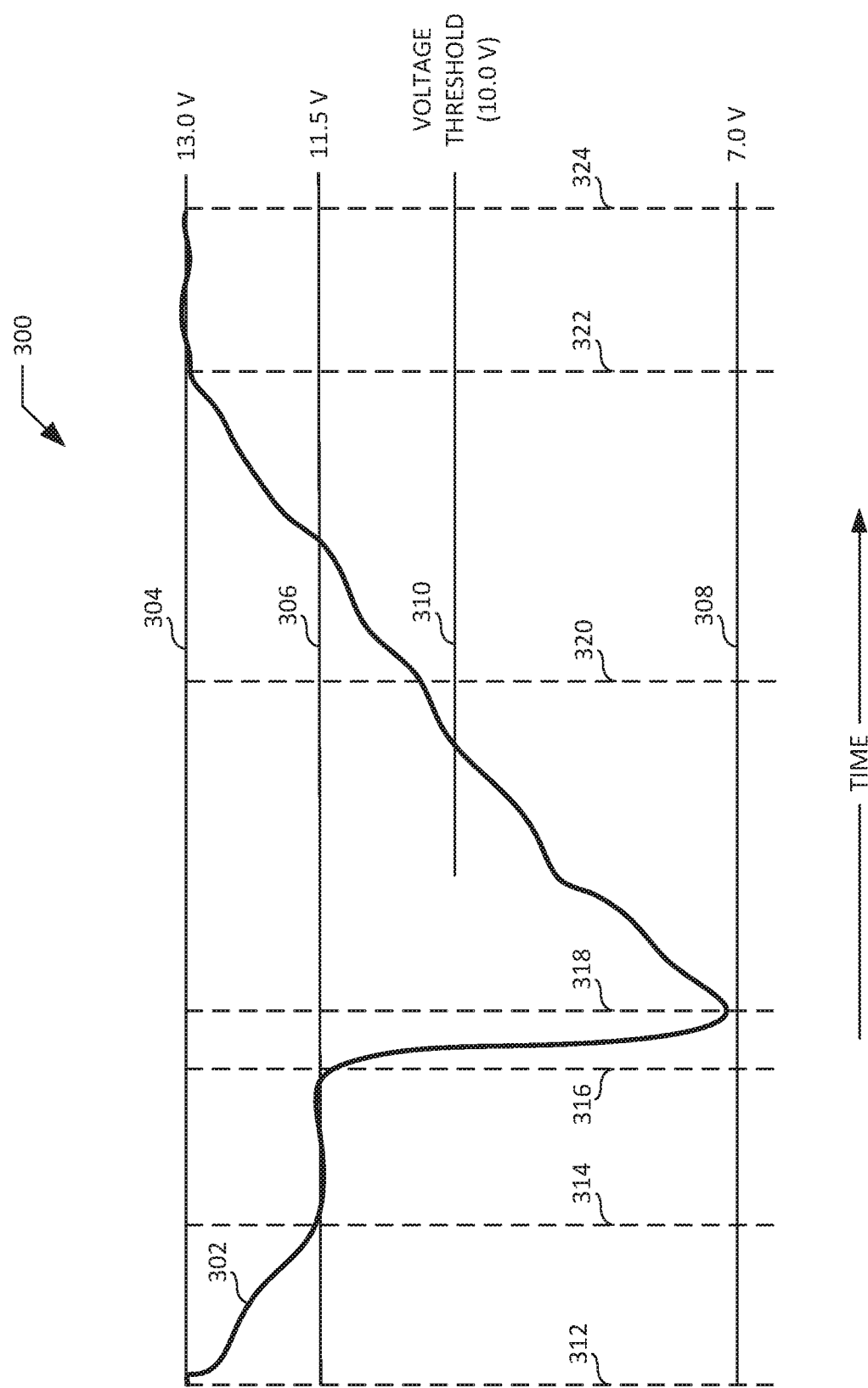
FIG. 3 is an example graph illustrating an example plot of battery voltage as a function of time, as may be encountered by the example EPAS system of FIG. 1.

FIG. 3 is an example graph 300 illustrating an example plot 302 of battery voltage as a function of time, as may be encountered by the example EPAS system 102 of FIG. 1. As shown in the illustrated example of FIG. 3, the vertical axis (e.g., the voltage axis) of the graph 300 is marked with a first example voltage 304, a second example voltage 306, a third example voltage 308, and a fourth example voltage 310. As further shown in the illustrated example of FIG. 3, the horizontal axis (e.g., the time axis) of the graph 300 is marked with a first example time 312, a second example time 314 subsequent to the first time 312, a third example time 316 subsequent to the second time 314, a fourth example time 318 subsequent to the third time 316, a fifth example time 320 subsequent to the fourth time 318, a sixth example time 322 subsequent to the fifth time 320, and a seventh example time 324 subsequent to the sixth time 322.

The first voltage 304 of FIG. 3 (e.g., 13.0 V) corresponds to a stabilized voltage of the battery 104 of FIG. 1 while the auto stop-start engine 106 of FIG. 1 is running and/or operating. The second voltage 306 of FIG. 3 (e.g., 11.5 V) corresponds to a stabilized voltage of the battery 104 of FIG. 1 while the auto stop-start engine 106 of FIG. 1 is auto stopped and before the auto stop-start engine 106 is re-cranked subsequent to the auto stop-start engine 106 having been auto stopped. The third voltage 308 of FIG. 3 (e.g., 7.0 V) corresponds to a reduce and/or lowered voltage of the battery 104 of FIG. 1 while the auto stop-start engine 106 of FIG. 1 is being re-cranked subsequent to the auto stop-start engine 106 having been auto stopped. The fourth voltage 310 of FIG. 3 (e.g., 10.0 V) corresponds to an example voltage threshold to be implemented by the EPAS controller 114 of FIG. 1 when determining whether a moving average voltage of the battery 104 of FIG. 1 exceeds the voltage threshold.

The period of time between the first time 312 and the second time 314 of FIG. 3 corresponds to an example period of time during which the auto stop-start engine 106 of FIG. 1 is auto stopping. As shown by the plot 302 of FIG. 3, the voltage of the battery 104 of FIG. 1 drops (e.g., decreases)

from the first voltage 304 of FIG. 3 (e.g., 13.0 V) to the second voltage 306 of FIG. 3 (e.g., 11.5 V) between the first time 312 and the second time 314 of FIG. 3. The period of time between the second time 314 and the third time 316 of FIG. 3 corresponds to an example period of time during which the auto stop-start engine 106 of FIG. 1 is auto stopped. As shown by the plot 302 of FIG. 3, the voltage of the battery 104 of FIG. 1 is stabilized at the second voltage 306 of FIG. 3 (e.g., 11.5 V) between the second time 314 and the third time 316 of FIG. 3.

The period of time between the third time 316 and the fourth time 318 of FIG. 3 corresponds to an example period of time during which the auto stop-start engine 106 of FIG. 1 is re-cranked. As shown by the plot 302 of FIG. 3, the voltage of the battery 104 of FIG. 1 rapidly drops (e.g., rapidly decreases) from the second voltage 306 of FIG. 3 (e.g., 11.5 V) to the third voltage 308 of FIG. 3 (e.g., 7.0 V) between the third time 316 and the fourth time 318 of FIG. 3. The period of time between the fourth time 318 and the fifth time 320 of FIG. 3 corresponds to an example period of time during which the auto stop-start engine 106 of FIG. 1 is auto starting in response to being re-cranked. As shown by the plot 302 of FIG. 3, the voltage of the battery 104 of FIG. 1 rises (e.g., increases) from the third voltage 308 of FIG. 3 (e.g., 7.0 V) to the fourth voltage 310 of FIG. 3 (e.g., 10.0 V) between the fourth time 318 and the fifth time 320 of FIG. 3.

The fifth time 320 of FIG. 3 corresponds to an example time at which the EPAS controller 114 of FIG. 1 generates one or more control signal(s) to ramp in current to the EPAS motor 116 of FIG. 1. In some example, the fifth time 320 of FIG. 3 matches and/or corresponds to the fourth time 216 of FIG. 2 described above. In other examples, the fourth time 216 of FIG. 2 described above may occur at any time between the fourth time 318 and the seventh time 324 of FIG. 3. In the illustrated example of FIG. 3, in response to determining at the fifth time 320 of FIG. 3 that a moving average voltage of the battery 104 of FIG. 1 exceeds a voltage threshold (e.g., the voltage threshold of 10.0 V as indicated by the fourth voltage 310 of FIG. 3), that a voltage rate of change of the battery 104 is greater than or equal to zero, and that a moving average engine speed of the auto stop-start engine 106 of FIG. 1 exceeds an engine speed threshold (e.g., the engine speed threshold of eighty percent of the idle speed of the auto stop-start engine 106 of FIG. 1 as indicated by the third engine speed 208 of FIG. 2 described above), the EPAS controller 114 generates one or more control signal(s) at the fifth time 320 of FIG. 3 to ramp in current to the EPAS motor 116. Thus, the EPAS motor 116 of FIG. 1 begins providing powered assistance at the fifth time 320 of FIG. 3.

The period of time between the fifth time 320 and the sixth time 322 of FIG. 3 corresponds to an example period of time during which the voltage of the battery 104 of FIG. 1 continues to recover (e.g., increase) in response to the auto stop-start engine 106 of FIG. 1 having been auto started. As shown by the plot 302 of FIG. 3, the voltage of the battery 104 of FIG. 1 rises (e.g., increases) from the fourth voltage 310 of FIG. 3 (e.g., 10.0 V) to the first voltage 304 of FIG. 3 (e.g., 13.0 V) between the fifth time 320 and the sixth time 322 of FIG. 3. The period of time between the sixth time 322 and the seventh time 324 of FIG. 3 corresponds to an example period of time during which the voltage of the battery 104 of FIG. 1 is stabilized in response to the auto stop-start engine 106 of FIG. 1 having been auto started. As shown by the plot 302 of FIG. 3, the voltage of the battery 104 of FIG. 1 is stabilized at the first voltage 304 of FIG. 3 (e.g., 13.0 V) between the sixth time 322 and the seventh time 324 of FIG. 3.

In conventional EPAS systems (e.g., EPAS systems predating the disclosed EPAS system 102 of FIG. 1), the EPAS motor of the conventional EPAS system does not begin providing powered assistance at the fifth time 320 of FIG. 3. Instead, the EPAS controller of the conventional EPAS system initiates a timer at the sixth time 322 of FIG. 3, and the EPAS motor of the conventional EPAS system does not begin providing powered assistance until the timer has expired at the seventh time 324 of FIG. 3. Thus, the difference in time between the fifth time 320 of FIG. 3 and the seventh time 324 of FIG. 3 corresponds to a reduced time delay provided by the disclosed EPAS system 102 of FIG. 1 relative to conventional EPAS systems with respect to the initial time at which current to an EPAS motor (e.g., the EPAS motor 116 of FIG. 1) is ramped in to enable the EPAS motor to provide powered assistance to a steering assembly of a vehicle (e.g., the vehicle 100 of FIG. 1) when an auto stop-start engine (e.g., the auto stop-start engine 106 of FIG. 1) is re-cranking and/or auto starting subsequent to the auto stop-start engine having been auto stopped.

Figure 4:
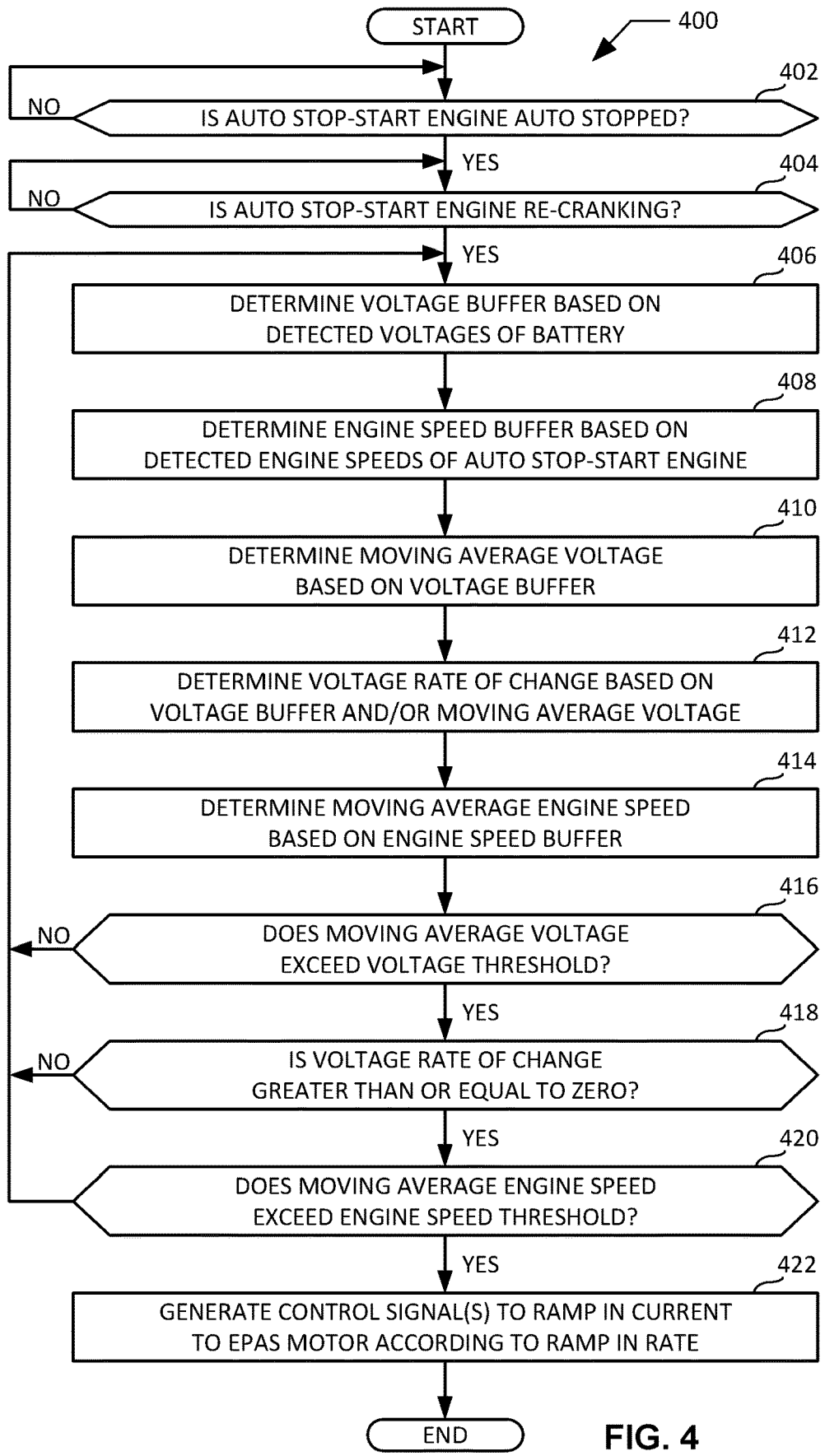
FIG. 4 is a flowchart representative of an example method that may be executed at the example EPAS controller of the example EPAS system of FIG. 1 to control a ramping in of current to the example EPAS motor of the example EPAS system of FIG. 1 while the example auto stop-start engine of FIG. 1 is re-cranking and/or auto starting subsequent to the auto stop-start engine having been auto stopped.

A flowchart representative of an example method for implementing the example EPAS controller 114 of the example EPAS system 102 of FIG. 1 to control a ramping in of current to the example EPAS motor 116 of the example EPAS system 102 of FIG. 1 while the example auto stop-start engine 106 of FIG. 1 is re-cranking and/or auto starting subsequent to the auto stop-start engine 106 having been auto stopped is shown in FIG. 4. In this example, the method may be implemented using machine readable instructions that comprise one or more program(s) for execution by one or more processor(s) such as the processor 502 shown in the example processor platform 500 discussed below in connection with FIG. 5. The one or more program(s) may be embodied in software stored on a non-transitory computer readable storage medium such as a CD-ROM, a floppy disk, a hard drive, a digital versatile disk (DVD), a Blu-ray disk, or a memory associated with the processor 502, but the entirety of any program and/or parts thereof could alternatively be executed by a device other than the processor 502, and/or embodied in firmware or dedicated hardware. Further, although the example program(s) is/are described with reference to the flowchart illustrated in FIG. 4, many other methods of implementing the example EPAS system 102 of FIGS. 1-3 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, a Field Programmable Gate Array (FPGA), an Application Specific Integrated circuit (ASIC), a comparator, an operational-amplifier (op-amp), a logic circuit, etc.) structured to perform the corresponding operation without executing software or firmware.

As mentioned above, the example method of FIG. 4 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. "Including" and "comprising" (and all forms and tenses thereof) are used herein to be open ended terms. Thus, whenever a claim lists anything following any form of "include" or "comprise" (e.g., comprises, includes, comprising, including, etc.), it is to be understood that additional elements, terms, etc. may be present without falling outside the scope of the corresponding claim. As used herein, when the phrase "at least" is used as the transition term in a preamble of a claim, it is open-ended in the same manner as the term "comprising" and "including" are open ended.

FIG. 4 is a flowchart representative of an example method 400 that may be executed at the example EPAS controller 114 of the example EPAS system 102 of FIG. 1 to control a ramping in of current to the example EPAS motor 116 of the example EPAS system 102 of FIG. 1 while the example auto stop-start engine 106 of FIG. 1 is re-cranking and/or auto starting subsequent to the auto stop-start engine 106 having been auto stopped. The example method 400 of FIG. 4 begins when the EPAS controller 114 of FIG. 1 determines whether the auto stop-start engine 106 of FIG. 1 is auto stopped (block 402). For example, the EPAS controller 114 may determine that the auto stop-start engine 106 is auto stopped based on engine state data sensed and/or detected by the engine state detector 108 of FIG. 1. If the EPAS controller 114 determines at block 402 that the auto stop-start engine 106 is auto stopped, control of the example method 400 of FIG. 4 proceeds to block 404. If the EPAS controller 114 instead determines at block 402 that the auto stop-start engine 106 is not auto stopped, control of the example method 400 of FIG. 4 remains at block 402.

At block 404, the EPAS controller 114 of FIG. 1 determines whether the auto stop-start engine 106 of FIG. 1 is re-cranking (block 404). For example, the EPAS controller 114 may determine, based on engine state data sensed and/or detected by the engine state detector 108 of FIG. 1, that the auto stop-start engine 106 is re-cranking subsequent to the auto stop-start engine 106 having been auto stopped. If the EPAS controller 114 determines at block 404 that the auto stop-start engine 106 is re-cranking, control of the example method 400 of FIG. 4 proceeds to block 406. If the EPAS controller 114 instead determines at block 404 that the auto stop-start engine 106 is not re-cranking, control of the example method 400 of FIG. 4 remains at block 404.

At block 406, the EPAS controller 114 of FIG. 1 determines a voltage buffer based on detected voltages of the battery 104 of FIG. 1 (block 406). For example, the EPAS controller 114 may determine and/or generate a voltage buffer (e.g., voltage buffer data) based on voltages (e.g., voltage data) of the battery 104 sensed, measured and/or detected by the voltage detector 110 of FIG. 1. In some examples, the EPAS controller 114 may determine and/or generate a voltage buffer ("VB") having the following arrangement and/or organizational scheme:

$$VB(t)=[V(t),V(t-TS),V(t-2TS),\ldots V(t-(N-1)(TS))]$$

where "t" is a given time, "VB(t)" is the voltage buffer at the given time (e.g., a time-based voltage buffer), "V(t)" is a voltage of the battery 104 of FIG. 1 at the given time (e.g., a time-based voltage), "TS" is a time step and/or time interval at which the voltage of the battery 104 is to be detected, and "N" is a total number of time-based voltage samples to be included and/or stored in the voltage buffer.

Following block 406, control of the example method 400 of FIG. 4 proceeds to block 408.

At block 408, the EPAS controller 114 of FIG. 1 determines an engine speed buffer based on detected engine speeds of the auto stop-start engine 106 of FIG. 1 (block 404). For example, the EPAS controller 114 may determine and/or generate an engine speed buffer (e.g., engine speed buffer data) based on engine speeds (e.g., engine speed data) of the auto stop-start engine 106 sensed, measured and/or detected by the engine speed detector 112 of FIG. 1. In some examples, the EPAS controller 114 may determine and/or generate an engine speed buffer ("ESB") having the following arrangement and/or organizational scheme:

$$ESB(t)=[ES(t),ES(t-TS),ES(t-2TS),\ldots ES(t-(N-1)(TS))]$$

where "t" is a given time, "ESB(t)" is the engine speed buffer at the given time (e.g., a time-based engine speed buffer), "ES(t)" is an engine speed of the auto stop-start engine 106 of FIG. 1 at the given time (e.g., a time-based engine speed), "TS" is a time step and/or time interval at which the engine speed of the auto stop-start engine 106 is to be detected, and "N" is a total number of time-based engine speed samples to be included and/or stored in the engine speed buffer. Following block 408, control of the example method 400 of FIG. 4 proceeds to block 410.

At block 410, the EPAS controller 114 of FIG. 1 determines a moving average voltage based on the voltage buffer (block 410). For example, the EPAS controller 114 may determine and/or calculate a moving average voltage (e.g., moving average voltage data) based on the voltage buffer (e.g., the voltage buffer data) determined by the EPAS controller 114 at block 406 of the method 400 of FIG. 4. In some examples, the EPAS controller 114 may determine and/or calculate a moving average voltage ("RAV") according to the following equation:

$$MAV(t)=[V(t)+V(t-TS)+V(t-2TS)+\ldots V(t-(N-1)(TS))]/(N)$$

where "t" is the given time, "MAV(t)" is the moving average voltage at the given time (e.g., a time-based moving average voltage), "V(t)" is the voltage of the battery 104 of FIG. 1 at the given time (e.g., the time-based voltage), "TS" is the time step and/or time interval at which the voltage of the battery 104 was detected, and "N" is the total number of time-based voltage samples included and/or stored in the voltage buffer. Following block 410, control of the example method 400 of FIG. 4 proceeds to block 412.

At block 412, the EPAS controller 114 of FIG. 1 determines a voltage rate of change based on the voltage buffer and/or based on the moving average voltage (block 412). For example, the EPAS controller 114 may determine and/or calculate a voltage rate of change (e.g., voltage rate of change data) based on the voltage buffer (e.g., the voltage buffer data) determined by the EPAS controller 114 at block 406 and/or based on the moving average voltage (e.g., the moving average voltage data) determined by the EPAS controller 114 at block 410 of the method 400 of FIG. 4. In some examples, the EPAS controller 114 determines and/or calculates the voltage rate of change based on successive moving average voltages determined and/or calculated by the EPAS controller 114. For example, the EPAS controller 114 may determine and/or calculate a voltage rate of change ("VRC") based on the above-described voltage buffer and/or the above-described moving average voltage according to the following equations:

$$MAV(t)=[V(t)+V(t-TS)+V(t-2TS)+\ldots V(t-(N-1)(TS))]/(N)$$

$$MAV(t-TS)=[V(t-TS)+V(t-2TS)+V(t-3TS)+\ldots V(t-(N)(TS))]/(N)$$

$$VRC(t)=[(MAV(t))-(MAV(t-TS))]/(TS)$$

where "t" is the given time, "MAV(t)" is the moving average voltage at the given time, "MAV(t-TS) is the moving average voltage at the time interval prior to the given time, "VRC(t)" is the voltage rate of change at the given time, "V(t)" is the voltage of the battery 104 of FIG. 1 at the given time (e.g., the time-based voltage), "TS" is the time step and/or time interval at which the voltage of the battery 104 was detected, and "N" is the total number of time-based voltage samples included and/or stored in the voltage buffer. Following block 412, control of the example method 400 of FIG. 4 proceeds to block 414.

At block 414, the EPAS controller 114 of FIG. 1 determines a moving average engine speed based on the engine speed buffer (block 414). For example, the EPAS controller 114 may determine and/or calculate a moving average engine speed (e.g., moving average engine speed data) based on the engine speed buffer (e.g., the engine speed buffer data) determined by the EPAS controller 114 at block 408 of the method 400 of FIG. 4. In some examples, the EPAS controller 114 may determine and/or calculate a moving average engine speed ("MAES") according to the following equation:

$$MAES(t)=[ES(t)+ES(t-TS)+ES(t-2TS)+\ldots ES(t-(N-1)(TS))]/(N)$$

where "t" is the given time, "MAES(t)" is the moving average engine speed at the given time (e.g., a time-based moving average engine speed), "ES(t)" is the engine speed of the auto stop-start engine 106 of FIG. 1 at the given time (e.g., the time-based engine speed), "TS" is the time step and/or time interval at which the engine speed of the auto stop-start engine 106 was detected, and "N" is the total number of time-based engine speed samples included and/or stored in the engine speed buffer. Following block 414, control of the example method 400 of FIG. 4 proceeds to block 416.

At block 416, the EPAS controller 114 of FIG. 1 determines whether the moving average voltage exceeds a voltage threshold (block 416). For example, the EPAS controller 114 may determine that an example moving average voltage equal to eleven volts exceeds an example voltage threshold equal to ten volts. If the EPAS controller 114 determines at block 416 that the moving average voltage exceeds the voltage threshold, control of the example method 400 of FIG. 4 proceeds to block 418. If the EPAS controller 114 instead determines at block 416 that the moving average voltage does not exceed the voltage threshold, control of the example method 400 of FIG. 4 returns to block 406.

At block 418, the EPAS controller 114 of FIG. 1 determines whether the voltage rate of change is greater than or equal to zero (block 418). For example, the EPAS controller 114 may determine that an example voltage rate of change equal to one volt is greater than zero volts. If the EPAS controller 114 determines at block 418 that the voltage rate of change is greater than or equal to zero, control of the example method 400 of FIG. 4 proceeds to block 420. If the EPAS controller 114 instead determines at block 418 that the voltage rate of change is not greater than or equal to zero (e.g., that the voltage rate of change is less than zero), control of the example method 400 of FIG. 4 returns to block 406.

At block 420, the EPAS controller 114 of FIG. 1 determines whether the moving average engine speed exceeds an engine speed threshold (block 420). For example, the EPAS controller 114 may determine that an example moving average engine speed equal to a value corresponding to ninety percent of the idle speed of the auto stop-start engine 106 of FIG. 1 exceeds an example engine speed threshold equal to a value corresponding to eighty percent of the idle speed of the auto stop-start engine 106. If the EPAS controller 114 determines at block 420 that the moving average engine speed exceeds the engine speed threshold, control of the example method 400 of FIG. 4 proceeds to block 422. If the EPAS controller 114 instead determines at block 420 that the moving average engine speed does not exceed the engine speed threshold, control of the example method 400 of FIG. 4 returns to block 406.

At block 422, the EPAS controller 114 of FIG. 1 generates one or more control signal(s) to ramp in current to the EPAS motor 116 of FIG. 1 according to a ramp in rate (block 422). In response to the EPAS controller 114 generating the control signal(s) at block 422, the degree and/or extent to which the EPAS motor 116 of FIG. 1 provides powered assistance to a steering assembly of a vehicle (e.g., the vehicle 100 of FIG. 1) implementing the EPAS system 102 of FIG. 1 increases as the current to the EPAS motor 116 is ramped in according to the ramp in rate. Following block 422, the example method 400 of FIG. 4 ends.

Figure 5:
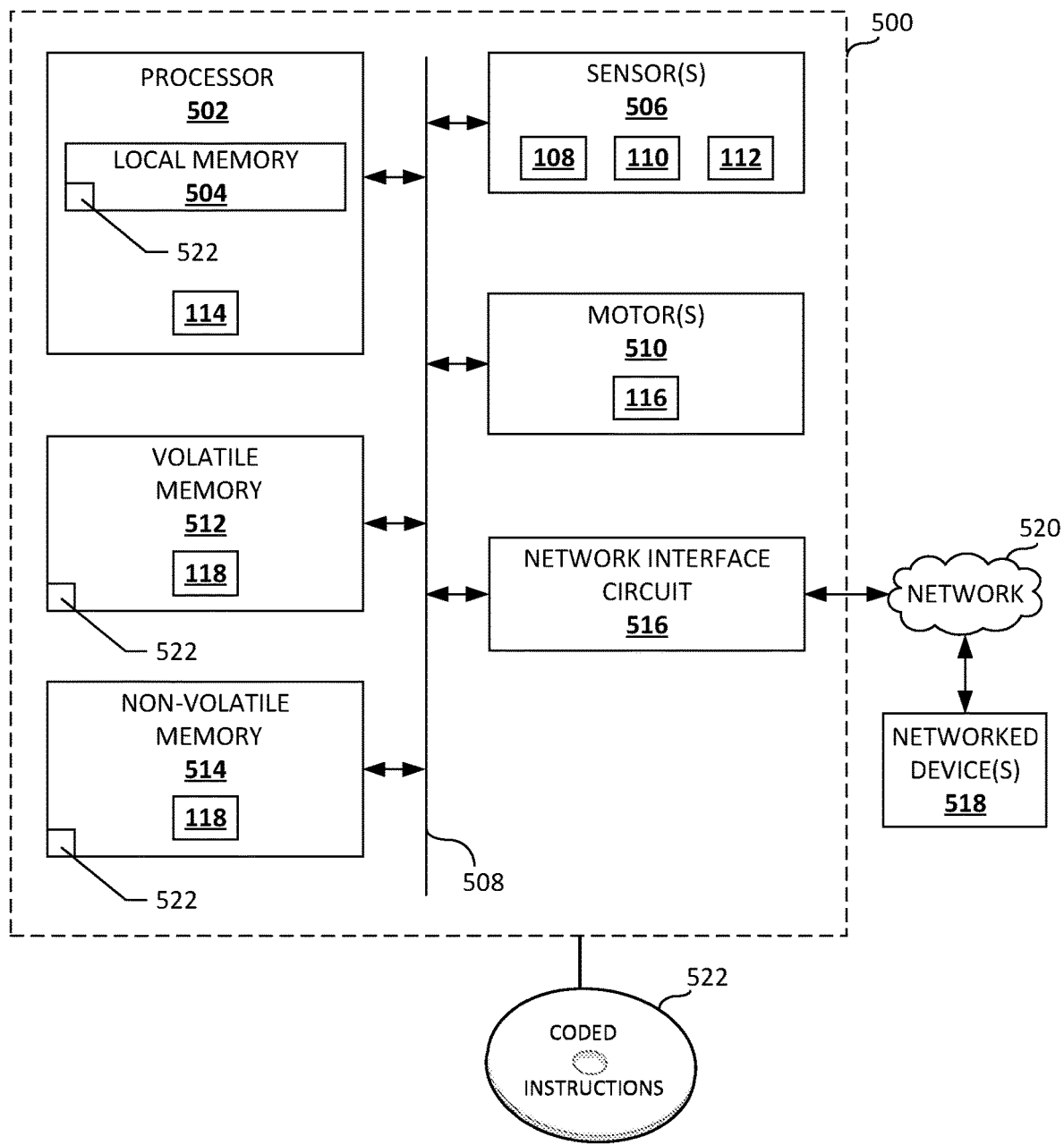
FIG. 5 is an example processor platform capable of executing instructions to implement the example method of FIG. 4 and the example EPAS system of FIG. 1.

FIG. 5 is a block diagram of an example processor platform 500 capable of executing instructions to implement the example method 400 of FIG. 4 and the example EPAS system 102 of FIG. 1. The processor platform 500 of the illustrated example includes a processor 502. The processor 502 of the illustrated example is hardware. For example, the processor 502 can be implemented by one or more integrated circuit(s), logic circuit(s), microprocessor(s) or controller(s) from any desired family or manufacturer. In the example of FIG. 5, the processor 502 implements the example EPAS controller 114 of FIG. 1. The processor 502 of the illustrated example also includes a local memory 504 (e.g., a cache).

The processor 502 of the illustrated example is in communication with one or more sensor(s) 506 via a bus 508 (e.g., a CAN bus). In the example of FIG. 5, the sensor(s) 506 include the example engine state detector 108, the example voltage detector 110, and the example engine speed detector 112 of FIG. 1. The processor 502 of the illustrated example is also in communication with one or more motor(s) 510 via the bus 508. In the example of FIG. 5, the motor(s) 510 include the example EPAS motor 116 of FIG. 1.

The processor 502 of the illustrated example is also in communication with a main memory including a volatile memory 512 and a non-volatile memory 514 via the bus 508. The volatile memory 512 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 514 may be implemented by flash memory and/or any other desired type of memory device. Access to the volatile memory 512 and the non-volatile memory 514 is controlled by a memory controller. In the illustrated example, the main memory 512, 514 includes the example EPAS memory 118 of FIG. 1.

The processor platform 500 of the illustrated example also includes a network interface circuit 516. The network interface circuit 516 may be implemented by any type of interface standard, such as an Ethernet interface, a universal serial bus (USB), and/or a PCI express interface. The network interface circuit 516 of the illustrated example includes a communication device such as a transmitter, a receiver, a transceiver, a modem and/or network interface card to facilitate exchange of data with one or more networked device(s) 518 (e.g., computing devices of any kind) via a network 520 (e.g., a controller area network, a wireless network, a cellular network, etc.).

Coded instructions 522 for implementing the example method 400 of FIG. 4 may be stored in the local memory 504, in the volatile memory 512, in the non-volatile memory 514, and/or on a removable tangible computer readable storage medium such as a CD or DVD.

From the foregoing, it will be appreciated that the disclosed methods and apparatus for controlling the ramp in of current to an EPAS motor associated with an auto stop-start engine advantageously reduce delays associated with the manner by which conventional EPAS systems ramp in current to the EPAS motor. For example, rather than ramping in current to the EPAS motor based on the implementation of a timer responsive to a steady state battery voltage (as done in the above-described conventional EPAS systems), the disclosed methods and apparatus advantageously ramp in current to the EPAS motor upon determining that a moving average voltage of the battery of the vehicle exceeds a voltage threshold set below a steady state voltage of the battery, that a voltage rate of change of the battery is greater than or equal to zero, and that a moving average engine speed of the auto stop-start engine of the vehicle exceeds an engine speed threshold set below an idle speed of the auto stop-start engine.

Ramping in current to the EPAS motor based on satisfaction of the aforementioned moving average voltage rate, voltage rate of change, and moving average engine speed conditions advantageously reduces the timer-based delays associated with the conventional EPAS systems described above. Moreover, the determination and subsequent analysis of moving average voltages, voltage rates of change based on the moving average voltages, and moving average engine speeds via the disclosed methods and apparatus ensures that the re-cranking and/or auto starting of the auto stop-start engine of the vehicle is successful prior to the ramping in of current to the EPAS motor. In this regard, the disclosed methods and apparatus offer a performance benefit over conventional EPAS systems that rely upon instant voltages and/or instant engine speeds (the instant values and/or peaks of which may be misleading) for purposes of determining when the ramping in of current to the EPAS motor is to occur. As a result of the aforementioned advantages and/or benefits, the disclosed methods and apparatus for controlling the ramp in of current to an EPAS motor associated with an auto stop-start engine reduce delays in the provision of powered assistance to the steering assembly of the vehicle, reduce drivability, performance and/or quality issues associated with the vehicle, and improve the level of customer (e.g., driver) satisfaction associated with the experience of driving the vehicle.

In some examples, an apparatus is disclosed. In some disclosed examples, the apparatus comprises a controller. In some disclosed examples, the controller is to determine a moving average voltage of a vehicle battery. In some disclosed examples, the controller is to determine a voltage rate of change based on the moving average voltage. In some disclosed examples, the controller is to determine a moving average engine speed of an auto stop-start engine of the vehicle. In some disclosed examples, the controller is to ramp in current to an electronic power assisted steering motor of the vehicle based on the moving average voltage, the voltage rate of change, and the moving average engine speed.

In some disclosed examples of the apparatus, the controller is to ramp in the current in response to determining that the moving average voltage exceeds a voltage threshold, that the voltage rate of change is greater than or equal to zero, and that the moving average engine speed exceeds an engine speed threshold. In some disclosed examples, the voltage threshold is configurable. In some disclosed examples, the voltage threshold is between nine volts and eleven volts. In some disclosed examples, the engine speed threshold is configurable. In some disclosed examples, the engine speed threshold is between sixty percent and ninety percent of an idle engine speed of the auto stop-start engine.

In some disclosed examples of the apparatus, the controller is to determine whether the auto stop-start engine is re-cranking subsequent to the auto-stop start engine having been auto stopped. In some disclosed examples, the controller is to determine the moving average voltage, the voltage rate of change, and the moving average engine speed in response to determining that the auto stop-start engine is re-cranking subsequent to the auto stop-start engine having been auto stopped.

In some disclosed examples of the apparatus, the controller is to determine a voltage buffer based on detected voltages of the vehicle battery. In some disclosed examples, the controller is to determine the moving average voltage based on the voltage buffer. In some disclosed examples, the controller is to determine the voltage rate of change based on the voltage buffer. In some disclosed examples, the voltage buffer is based on a configurable time step and a configurable number of samples.

In some disclosed examples of the apparatus, the controller is to determine an engine speed buffer based on detected engine speeds of the auto stop-start engine. In some disclosed examples, the controller is to determine the moving average engine speed based on the engine speed buffer. In some disclosed examples, the engine speed buffer is based on a configurable time step and a configurable number of samples.

In some disclosed examples of the apparatus, the controller is to ramp in the current according to a ramp in rate. In some disclosed examples, the ramp in rate is configurable.

In some examples, a method is disclosed. In some disclosed examples, the method comprises determining, by executing one or more instructions with the controller, a moving average voltage of a vehicle battery. In some disclosed examples, the method comprises determining, by executing one or more instructions with a controller, a voltage rate of change based on the moving average voltage. In some disclosed examples, the method comprises determining, by executing one or more instructions with the controller, a moving average engine speed of auto stop-start engine of the vehicle. In some disclosed examples, the method comprises ramping in, by executing one or more instructions with the controller, current to an electronic power assisted steering motor of the vehicle based on the moving average voltage, the voltage rate of change, and the moving average engine speed.

In some disclosed examples of the method, the ramping in of the current is in response to determining, by executing one or more instructions with the controller, that the moving average voltage exceeds a voltage threshold, that the voltage rate of change is greater than or equal to zero, and that the moving average engine speed exceeds an engine speed threshold. In some disclosed examples, the voltage threshold is configurable. In some disclosed examples, the voltage threshold is between nine volts and eleven volts. In some disclosed examples, the engine speed threshold is configurable. In some disclosed examples, the engine speed threshold is between sixty percent and ninety percent of an idle engine speed of the auto stop-start engine.

In some disclosed examples the method further comprises determining, by executing one or more instructions with the controller, whether the auto stop-start engine is re-cranking subsequent to the auto-stop start engine having been auto stopped. In some disclosed examples, the determining of the moving average voltage, the determining of the voltage rate of change, and the determining of the moving average engine speed are in response to determining that the auto stop-start engine is re-cranking subsequent to the auto stop-start engine having been auto stopped.

In some disclosed examples, the method further comprises determining, by executing one or more instructions with the controller, a voltage buffer based on detected voltages of the vehicle battery. In some disclosed examples, the determining of the moving average voltage is based on the voltage buffer. In some disclosed examples, the determining of the voltage rate of change is based on the voltage buffer. In some disclosed examples, the voltage buffer is based on a configurable time step and a configurable number of samples.

In some disclosed examples, the method further comprises determining, by executing one or more instructions with the controller, an engine speed buffer based on detected engine speeds of the auto stop-start engine. In some disclosed examples, the determining of the moving average engine speed is based on the engine speed buffer. In some disclosed examples, the engine speed buffer is based on a configurable time step and a configurable number of samples.

In some disclosed examples of the method, the ramping in of the current is based on a ramp in rate. In some disclosed examples, the ramp in rate is configurable.

In some examples, a non-transitory machine readable storage medium comprising instructions is disclosed. In some disclosed examples, the instructions, when executed, cause a controller to determine a moving average voltage of a vehicle battery. In some disclosed examples, the instructions, when executed, cause the controller to determine a voltage rate of change based on the moving average voltage. In some disclosed examples, the instructions, when executed, cause the controller to determine a moving average engine speed of an auto stop-start engine of the vehicle. In some disclosed examples, the instructions, when executed, cause the controller to ramp in current to an electronic power assisted steering motor of the vehicle based on the moving average voltage, the voltage rate of change, and the moving average engine speed.

In some disclosed examples of the non-transitory machine readable storage medium, the instructions, when executed, cause the controller to ramp in the current in response to the controller determining that the moving average voltage exceeds a voltage threshold, that the voltage rate of change is greater than or equal to zero, and that the moving average engine speed exceeds an engine speed threshold. In some disclosed examples, the voltage threshold is configurable. In some disclosed examples, the voltage threshold is between nine volts and eleven volts. In some disclosed examples, the engine speed threshold is configurable. In some disclosed examples, the engine speed threshold is between sixty percent and ninety percent of an idle engine speed of the auto stop-start engine.

In some disclosed examples of the non-transitory machine readable storage medium, the instructions, when executed, cause the controller to determine whether the auto stop-start engine is re-cranking subsequent to the auto-stop start engine having been auto stopped. In some disclosed examples, the instructions, when executed, cause the controller to determine the moving average voltage, the voltage rate of change, and the moving average engine speed in response to the controller determining that the auto stop-start engine is re-cranking subsequent to the auto stop-start engine having been auto stopped.

In some disclosed examples of the non-transitory machine readable storage medium, the instructions, when executed, cause the controller to determine a voltage buffer based on detected voltages of the vehicle battery. In some disclosed examples, the instructions cause the controller to determine the moving average voltage based on the voltage buffer. In some disclosed examples, the instructions cause the controller to determine the voltage rate of change based on the voltage buffer. In some disclosed examples, the voltage buffer is based on a configurable time step and a configurable number of samples.

In some disclosed examples of the non-transitory machine readable storage medium, the instructions, when executed, cause the controller to determine an engine speed buffer based on detected engine speeds of the auto stop-start engine. In some disclosed examples, the instructions cause the controller to determine the moving average engine speed based on the engine speed buffer. In some disclosed examples, the engine speed buffer is based on a configurable time step and a configurable number of samples.

In some disclosed examples of the non-transitory machine readable storage medium, the instructions, when executed, cause the controller to ramp in the current according to a ramp in rate. In some disclosed examples, the ramp in rate is configurable.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus, comprising:
   a controller configured to control an electronic power assisted steering (EPAS) motor of a vehicle, the controller including one or more processors configured to:
   determine a moving average voltage of a battery of the vehicle;
   determine a voltage rate of change based on the moving average voltage;
   determine a moving average engine speed of an auto stop-start engine of the vehicle; and
   generate a current ramp-in initiation control signal at a first time during a time period in which the auto stop-start engine is re-cranking subsequent to the auto stop-start engine having been auto stopped, the generation of the current ramp-in initiation control signal being in response to determining, during the time period, (1) that the moving average voltage exceeds a voltage threshold, (2) that the voltage rate of change is greater than or equal to zero, and (3) that the moving average engine speed exceeds an engine speed threshold, wherein the current ramp-in initiation control signal is configured to initiate a ramp-in of input current to the EPAS motor at a predetermined ramp-in rate, based on ramp-in rate data accessed from a memory, at a second time during the time period, the second time being at or subsequent to the first time, the second time being prior to a third time at which the moving average voltage reaches a steady state voltage of the battery after increasing in association with the re-cranking, the second time being prior to a fourth time at which the moving average engine speed reaches an idle speed of the auto stop-start engine after increasing in association with the re-cranking.

2. The apparatus of claim 1, wherein the voltage threshold is configurable.

3. The apparatus of claim 1, wherein the voltage threshold is between nine volts and eleven volts.

4. The apparatus of claim 1, wherein the engine speed threshold is configurable.

5. The apparatus of claim 1, wherein the engine speed threshold is between sixty percent and ninety percent of an idle engine speed of the auto stop-start engine.

6. The apparatus of claim 1, wherein the one or more processors are configured to determine a voltage buffer based on detected voltages of the battery, the one or more processors configured to determine the moving average voltage based on the voltage buffer.

7. The apparatus of claim 6, wherein the one or more processors are configured to determine the voltage rate of change based on the voltage buffer.

8. The apparatus of claim 6, wherein the voltage buffer is based on a configurable time step and a configurable number of samples.

9. The apparatus of claim 1, wherein the one or more processors are configured to determine an engine speed buffer based on detected engine speeds of the auto stop-start engine, the one or more processors configured to determine the moving average engine speed based on the engine speed buffer.

10. The apparatus of claim 9, wherein the engine speed buffer is based on a configurable time step and a configurable number of samples.

11. The apparatus of claim 1, wherein the predetermined ramp-in rate is configurable.

12. The apparatus of claim 1, wherein the one or more processors are configured to:
determine whether the auto stop-start engine is auto stopped; and
determine, in response to determining that the auto stop-start engine is auto stopped, whether the auto stop-start engine is re-cranking;
wherein the one or more processors are configured to determine the moving average voltage, the voltage rate of change, and the moving average engine speed in response to determining that the auto stop-start engine is re-cranking subsequent to the auto stop-start engine having been auto stopped.

13. The apparatus of claim 1, wherein the input current to the EPAS motor is ramped out to a terminated state in response to the auto stop-start engine becoming auto stopped.

14. The apparatus of claim 13, wherein the current ramp-in initiation control signal increases the input current to the EPAS motor from the terminated state.

15. A method comprising:
determining, by executing one or more instructions with one or more processors of a controller configured to control an electronic power assisted steering (EPAS) motor of a vehicle, a moving average voltage of a battery of the vehicle;
determining, by executing one or more instructions with the one or more processors, a voltage rate of change based on the moving average voltage;
determining, by executing one or more instructions with the one or more processors, a moving average engine speed of an auto stop-start engine of the vehicle; and
generating, by executing one or more instructions with the one or more processors, a current ramp-in initiation control signal at a first time during a time period in which the auto stop-start engine is re-cranking subsequent to the auto stop-start engine having been auto stopped, the generating of the current ramp-in initiation control signal being in response to determining, during the time period, (1) that the moving average voltage exceeds a voltage threshold, (2) that the voltage rate of change is greater than or equal to zero, and (3) that the moving average engine speed exceeds an engine speed threshold, wherein the current ramp-in initiation control signal is configured to initiate a ramp-in of input current to the EPAS motor at a predetermined ramp-in rate, based on ramp-in rate data accessed from a memory, at a second time during the time period, the second time being at or subsequent to the first time, the second time being prior to a third time at which the moving average voltage reaches a steady state voltage of the battery after increasing in association with the re-cranking, the second time being prior to a fourth time at which the moving average engine speed reaches an idle speed of the auto stop-start engine after increasing in association with the re-cranking.

16. The method of claim 15, further comprising determining, by executing one or more instructions with the one or more processors, a voltage buffer based on detected voltages of the battery, the determining of the moving average voltage being based on the voltage buffer.

17. The method of claim 15, further comprising determining, by executing one or more instructions with the one or more processors, an engine speed buffer based on detected engine speeds of the auto stop-start engine, the determining of the moving average engine speed being based on the engine speed buffer.

18. A non-transitory computer readable storage medium comprising instructions that, when executed, cause one or more processors of a controller configured to control an electronic power assisted steering (EPAS) motor of a vehicle to at least:
determine a moving average voltage of a battery of the vehicle;
determine a voltage rate of change based on the moving average voltage;
determine a moving average engine speed of an auto stop-start engine of the vehicle; and
generate a current ramp-in initiation control signal at a first time during a time period in which the auto stop-start engine is re-cranking subsequent to the auto stop-start engine having been auto stopped, the generating of the current ramp-in initiation control signal being in response to determining, during the time period, (1) that the moving average voltage exceeds a voltage threshold, (2) that the voltage rate of change is greater than or equal to zero, and (3) that the moving average engine speed exceeds an engine speed threshold, wherein the current ramp-in initiation control signal is configured to initiate a ramp-in of input current to the EPAS motor at a predetermined ramp-in rate, based on ramp-in rate data accessed from a memory, at a second time during the time period, the second time being at or subsequent to the first time, the second time being prior to a third time at which the moving average voltage reaches a steady state voltage of the battery after increasing in association with the re-cranking, the second time being prior to a fourth time at which the moving average engine speed reaches an idle speed of the auto stop-start engine after increasing in association with the re-cranking.

19. The non-transitory computer readable storage medium of claim 18, wherein the instructions, when executed, cause the one or more processors to determine a voltage buffer based on detected voltages of the battery, the instructions to cause the one or more processors to determine the moving average voltage based on the voltage buffer.

20. The non-transitory computer readable storage medium of claim 18, wherein the instructions, when executed, cause the one or more processors to determine an engine speed buffer based on detected engine speeds of the auto stop-start engine, the instructions to cause the one or more processors to determine the moving average engine speed based on the engine speed buffer.

\* \* \* \* \*